(12) United States Patent
Zhu et al.

(10) Patent No.: US 10,606,949 B2
(45) Date of Patent: Mar. 31, 2020

(54) ARTIFICIAL INTELLIGENCE BASED METHOD AND APPARATUS FOR CHECKING TEXT

(71) Applicant: BEIJING BAIDU NETCOM SCIENCE AND TECHNOLOGY CO., LTD., Beijing (CN)

(72) Inventors: Zhifan Zhu, Beijing (CN); Shikun Feng, Beijing (CN); Kunsheng Zhou, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 157 days.

(21) Appl. No.: 15/921,386

(22) Filed: Mar. 14, 2018

(65) Prior Publication Data

US 2018/0349350 A1 Dec. 6, 2018

(30) Foreign Application Priority Data

Jun. 1, 2017 (CN) .......................... 2017 1 0404268

(51) Int. Cl.
*G06F 17/27* (2006.01)
*G06N 3/08* (2006.01)
(Continued)

(52) U.S. Cl.
CPC ........ *G06F 17/277* (2013.01); *G06F 17/2211* (2013.01); *G06N 3/0454* (2013.01);
(Continued)

(58) Field of Classification Search
CPC ........ G06N 3/0454; G06N 3/02; G06F 17/20; G06F 17/21; G06F 17/277
See application file for complete search history.

(56) References Cited

U.S. PATENT DOCUMENTS

2004/0243537 A1* 12/2004 Wang .................. G06F 16/9535
2017/0046613 A1* 2/2017 Paluri .................. G06N 3/0454
(Continued)

OTHER PUBLICATIONS

Xu et al., "Short Term Clustering via Convolutional Neural Networks", In Proceedings of NAACL-HLT (Year: 2015).*
(Continued)

*Primary Examiner* — Samuel G Neway
(74) *Attorney, Agent, or Firm* — Seed IP Law Group LLP (57) ABSTRACT

This disclosure discloses an artificial intelligence based method and apparatus for checking a text. An embodiment of the method comprises: lexing a first to-be-checked text and a second to-be-checked text respectively, determining word vectors of the lexed words to generate a first word vector sequence and a second word vector sequence; inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer as eigenvector sequences, to obtain eigenvector sequence groups respectively corresponding to the texts; combining eigenvector sequences in each eigenvector sequence group to generate a combined eigenvector sequence; and analyzing the generated combined eigenvector sequences to determine whether the first text and the second text pass a similarity check. The embodiment improves the flexibility in checking a text.

13 Claims, 6 Drawing Sheets

(51) Int. Cl.
*G06F 17/22* (2006.01)
*G06N 3/04* (2006.01)
*G06N 3/02* (2006.01)

(52) U.S. Cl.
CPC ............. *G06N 3/08* (2013.01); *G06F 17/274* (2013.01); *G06F 17/2785* (2013.01); *G06N 3/02* (2013.01)

(56) References Cited

U.S. PATENT DOCUMENTS

2018/0349350 A1* 12/2018 Zhu .................. G06F 17/277
2018/0365231 A1* 12/2018 Li ..................... G06N 3/0454

OTHER PUBLICATIONS

He et al., "Multi-Perspective Sentence Similarity Modeling with Convolutional Neural Networks," Proceedings of the 2015 Conference on Empirical Methods in Natural Language Processing, Sep. 2015, 11 pages.

* cited by examiner

201 lexing a first to-be-checked text and a second to-be-checked text respectively, determining word vectors of the lexed words to generate a first word vector sequence corresponding to the first text and a second word vector sequence corresponding to the second text

202 inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts

203 combining eigenvector sequences in the identified eigenvector sequence group corresponding to each text to generate a combined eigenvector sequence corresponding to the each text

204 analyzing the generated combined eigenvector sequences to determine whether the first text and the second text pass a similarity check

501 — lexing a first to-be-checked text and a second to-be-checked text respectively, determining word vectors of the lexed words to generate a first word vector sequence corresponding to the first text and a second word vector sequence corresponding to the second text

502 — inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts

503 — combining eigenvector sequences in the identified eigenvector sequence group corresponding to each text to generate a combined eigenvector sequence corresponding to the each text

504 — extracting, for each text, a maximum value in each dimension of the eigenvectors contained in a combined eigenvector sequence corresponding to the each text, to generate a target eigenvector corresponding to the each text

505 — inputting the generated target eigenvectors into a pre-trained similarity prediction model to obtain similarity prediction result of the first text and the second text

506 — determining whether the first text and the second text pass the similarity check based on the obtained similarity prediction result

ARTIFICIAL INTELLIGENCE BASED METHOD AND APPARATUS FOR CHECKING TEXT

CROSS-REFERENCE TO RELATED APPLICATIONS

This application is related to and claims priority from Chinese Patent Application No. 201710404268.5, filed with the State Intellectual Property Office (SIPO) of the People's Republic of China on Jun. 1, 2017, the entire disclosure of the Chinese application is hereby incorporated by reference.

TECHNICAL FIELD

This disclosure relates to the field of computer technology, specifically to the field of Internet technology, and more specifically to an artificial intelligence based method and apparatus for checking a text.

BACKGROUND

Artificial intelligence (AI) is a new technical science on research and development of theories, methodologies, technologies and application systems for simulating and extending human intelligence. Artificial intelligence is a branch of computer science, attempts to understand the essence of intelligence, and produces a new intelligent machine that may make a response in a form similar to human intelligence. The research in this field includes robots, speech recognition, image recognition, natural language processing, expert systems, etc. Natural language processing in the field of artificial intelligence is an important direction in the field of computer science and in the field of artificial intelligence. It researches various theories and methods that may realize effective communication between human and computer using a natural language. Usually, it is necessary to check text similarity or the like using a convolutional neural network (CNN).

However, the convolutional neural network used in existing methods usually only supports convolution in a fixed scale (i.e., the number of vectors inputted into a convolution kernel of a convolutional layer of the convolutional neural network each time, also known as a window length), thus having a problem of relatively low flexibility in checking a text.

SUMMARY

An object of embodiments of this disclosure is to provide an improved artificial intelligence based method and apparatus for checking a text, so as to solve the technical problem mentioned in the above background part.

In a first aspect, an embodiment of this disclosure provides an artificial intelligence based method for checking a text, the method including: lexing a first to-be-checked text and a second to-be-checked text respectively, determining word vectors of the lexed words to generate a first word vector sequence corresponding to the first text and a second word vector sequence corresponding to the second text; inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, wherein the convolutional neural network is used for extracting characteristics of texts; combining eigenvector sequences in the identified eigenvector sequence group corresponding to each text to generate a combined eigenvector sequence corresponding to the each text; and analyzing the generated combined eigenvector sequences to determine whether the first text and the second text pass a similarity check.

In some embodiments, the analyzing the generated combined eigenvector sequences to determine whether the first text and the second text pass a similarity check includes: extracting, for each text, a maximum value in each dimension of the eigenvectors contained in a combined eigenvector sequence corresponding to the each text, to generate a target eigenvector corresponding to the each text; and determining whether the first text and the second text pass the similarity check based on the generated target eigenvectors corresponding to the texts.

In some embodiments, the determining whether the first text and the second text pass the similarity check based on the generated target eigenvectors corresponding to the texts includes: inputting the generated target eigenvectors into a pre-trained similarity prediction model to obtain similarity prediction result of the first text and the second text, wherein the similarity prediction model is used for characterizing a corresponding relationship between target eigenvector sequences of a plurality of texts and similarity prediction results of the plurality of texts; and determining whether the first text and the second text pass the similarity check based on the obtained similarity prediction result.

In some embodiments, the method further includes training the similarity prediction model, including: extracting a preset training sample, wherein the training sample includes a first training text, a second training text, and an identifier for indicating whether the first training text is similar to the second training text; analyzing the first training text and the second training text to generate target eigenvectors respectively corresponding to the first training sample and the second training sample; and obtaining the similarity prediction model by training using a machine learning method, using the target eigenvectors respectively corresponding to the first training sample and the second training sample as inputs, and using the identifier as an input.

In some embodiments, the determining whether the first text and the second text pass the similarity check based on the generated target eigenvectors corresponding to the texts includes: determining a similarity between a target eigenvector corresponding to the first text and a target eigenvector corresponding to the second text; and determining the first text and the second text passing the similarity check in response to determining the similarity being greater than a preset similarity threshold; determining the first text and the second text failing to pass the similarity check in response to determining the similarity being not greater than the similarity threshold.

In some embodiments, a deep coherent layer and a pooling layer are arranged between adjacent multi-scale convolutional layers in the at least one multi-scale convolutional layer, the deep coherent layer is used for combining a plurality of vector sequences outputted by the multi-scale convolutional layer to generate a combined vector sequence consisting of a plurality of combined vectors, and the pooling layer is used for analyzing the combined vector sequence generated by the deep coherent layer in a preset window size and a preset window sliding step length to obtain a simplified combined vector sequence.

In a second aspect, an embodiment of this disclosure provides an artificial intelligence based apparatus for checking a text, the apparatus including: a lexer unit, configured for lexing a first to-be-checked text and a second to-be-checked text respectively, determining word vectors of the lexed words to generate a first word vector sequence corresponding to the first text and a second word vector sequence corresponding to the second text; an input unit, configured for inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, wherein the convolutional neural network is used for extracting characteristics of texts; a combination unit, configured for combining eigenvector sequences in the identified eigenvector sequence group corresponding to each text to generate a combined eigenvector sequence corresponding to the each text; and an analysis unit, configured for analyzing the generated combined eigenvector sequences to determine whether the first text and the second text pass a similarity check.

In some embodiments, the analysis unit includes: a generation module, configured for extracting, for each text, a maximum value in each dimension of the eigenvectors contained in a combined eigenvector sequence corresponding to the each text, to generate a target eigenvector corresponding to the each text; and a determination module, configured for determining whether the first text and the second text pass the similarity check based on the generated target eigenvectors corresponding to the texts.

In some embodiments, the determination module is further configured for: inputting the generated target eigenvectors into a pre-trained similarity prediction model to obtain similarity prediction result of the first text and the second text, wherein the similarity prediction model is used for characterizing a corresponding relationship between target eigenvector sequences of a plurality of texts and similarity prediction results of the plurality of texts; and determining whether the first text and the second text pass the similarity check based on the obtained similarity prediction result.

In some embodiments, the apparatus further includes: an extraction unit, configured for extracting a preset training sample, wherein the training sample includes a first training text, a second training text, and an identifier for indicating whether the first training text is similar to the second training text; a generation unit, configured for analyzing the first training text and the second training text to generate target eigenvectors respectively corresponding to the first training sample and the second training sample; and a training unit, configured for obtaining the similarity prediction model by training using a machine learning method, using the target eigenvectors respectively corresponding to the first training sample and the second training sample as inputs, and using the identifier as an input.

In some embodiments, the determination module is further configured for: determining a similarity between a target eigenvector corresponding to the first text and a target eigenvector corresponding to the second text; and determining the first text and the second text passing the similarity check in response to determining the similarity being greater than a preset similarity threshold; determining the first text and the second text failing to pass the similarity check in response to determining the similarity being not greater than the similarity threshold.

In some embodiments, a deep coherent layer and a pooling layer are arranged between adjacent multi-scale convolutional layers in the at least one multi-scale convolutional layer, the deep coherent layer is used for combining a plurality of vector sequences outputted by the multi-scale convolutional layer to generate a combined vector sequence consisting of a plurality of combined vectors, and the pooling layer is used for analyzing the combined vector sequence generated by the deep coherent layer in a preset window size and a preset window sliding step length to obtain a simplified combined vector sequence.

In a third aspect, an embodiment of this disclosure provides a server, including one or more processors; and a storage device for storing one or more programs, where the one or more programs, when executed by the one or more processors, enable the one or more processors to implement a method, e.g., an artificial intelligence based method for checking a text, according to any one embodiment.

The artificial intelligence based method and apparatus for checking a text provided in an embodiment of this disclosure lex a first to-be-checked text and a second to-be-checked text respectively to generate a first word vector sequence and a second word vector sequence, input the first word vector sequence and the second word vector sequence respectively into a pre-trained convolutional neural network containing at least one multi-scale convolutional layer to obtain eigenvector sequence groups respectively corresponding to the texts, combine eigenvector sequences to generate combined eigenvector sequences corresponding to the texts; and finally analyze the generated combined eigenvector sequences to determine whether the first text and the second text pass a similarity check, thereby implementing calculation of multi-scale convolution of word vector sequences, and improving the flexibility in checking a text relative to the calculation of a single fixed-scale convolution.

BRIEF DESCRIPTION OF THE DRAWINGS

By reading and referring to the detailed description of non-limiting embodiments provided in the accompanying drawings, other features, objects and advantages of the disclosure will become clearer.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
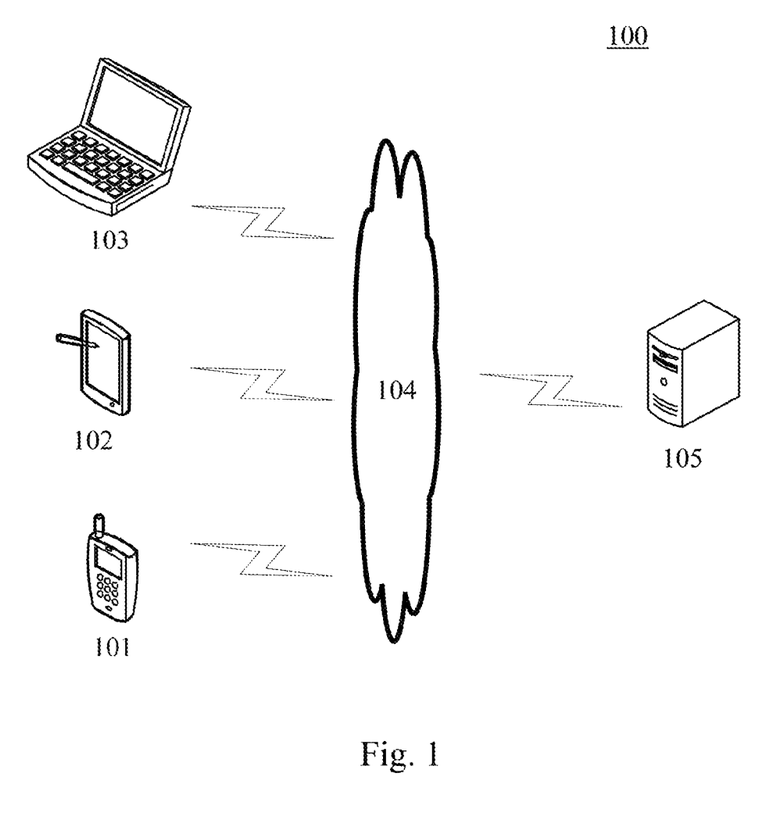
FIG. 1 is an illustrative system structure diagram where the disclosure may be applied.

FIG. 1 shows an illustrative architecture of a system 100 which may be used by a method for checking a text or an apparatus for checking a text according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as text editing applications, web browser applications, and reader applications may be installed on the terminal devices 101, 102 and 103.

The terminal devices 101, 102 and 103 may be various electronic devices having a display and capable of browsering a text, including but not limited to, smart phones, tablet computers, e-book readers, laptop computers and desktop computers.

The server 105 may be a server providing various services, e.g., a processing server providing similarity check and other services for to-be-checked texts stored on the terminal devices 101, 102 and 103. The processing server may process texts by lex, analysis, etc., and generate processed results (e.g., text check result for indicating whether passing the similarity check or not).

It should be noted that the to-be-checked texts may also be directly locally stored on the server 105, which may directly extract and process the locally stored to-be-checked texts. Under the circumstance, the terminal devices 101, 102 and 103 and the network 104 may not exist.

It should be noted that the method for checking a text provided in an embodiment of the disclosure is generally executed by the server 105, and correspondingly, the apparatus for checking a text is generally arranged within the server 105.

It should be understood that the numbers of terminal devices, networks and servers in FIG. 1 are only indicative. Depending on the actual needs, any numbers of terminal devices, networks and servers may exist.

Figure 2:
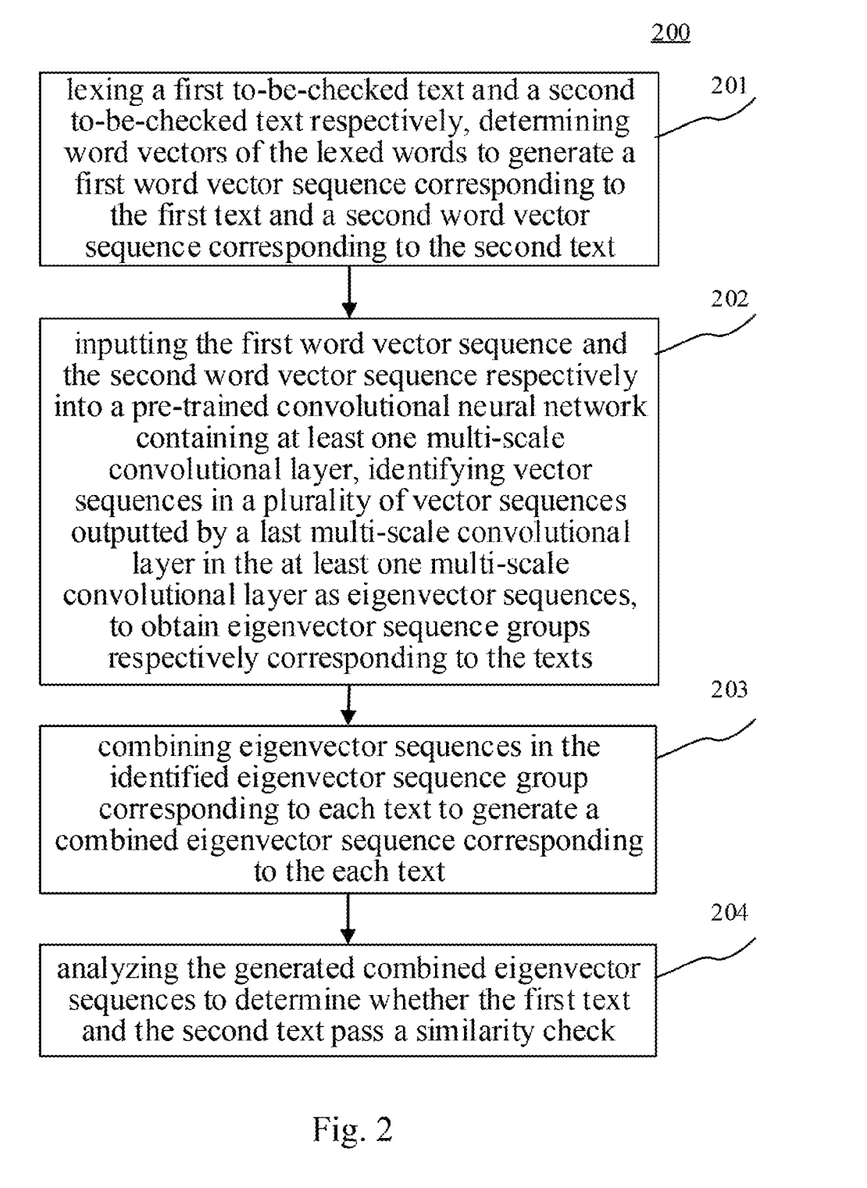
FIG. 2 is a flow diagram of an embodiment of a method for checking a text according to the disclosure.

Further referring to FIG. 2, a flow process 200 of an embodiment of a method for checking a text according to this disclosure is shown. The method for checking a text includes the following steps:

Step 201, lexing a first to-be-checked text and a second to-be-checked text respectively, determining word vectors of the lexed words to generate a first word vector sequence corresponding to the first text and a second word vector sequence corresponding to the second text.

In this embodiment, an electronic device (e.g., the server 105 shown in FIG. 1) on which a method for checking a text runs may first extract a first to-be-checked text and a second to-be-checked text, where the first text and the second text may be texts pre-stored in the electronic device and pre-assigned by technical personnel, and the electronic device may directly extract the locally pre-stored texts. In addition, the first text and the second text may also be texts received by the electronic device from clients (e.g., the terminal devices 101, 102 and 103 shown in FIG. 1) through wired connection or wireless connection. In practice, the clients may send a request for checking texts, including the first text and the second text, to the electronic device, which may, upon receiving the request for checking texts, extract the texts contained in the request for checking texts. It should be noted that the first text and the second text may be a variety of text messages, e.g., sentences, paragraphs, writings or the like. It should be noted that the wireless connection may include, but is not limited to, 3G/4G connection, WiFi connection, bluetooth connection, WiMAX connection, Zigbee connection, UWB (ultra wideband) connection, and other wireless connections that are known at present or will be developed in the future.

In this embodiment, the electronic device may lex the first text and the second text using a variety of lex methods; and then determine word vectors of the lexed words using a variety of word vector generation methods, to generate a first word vector sequence corresponding to the first text and a second word vector sequence corresponding to the second text. It should be noted that a word vector may be a vector for showing word characteristics, and a value in each dimension of the word vector represents a characteristic having a certain semantic and grammatical explanation, where the characteristic may be a variety of information for characterizing basic elements of a word. It should be noted that the electronic device may sequentially arrange word vectors of the words obtained by the lexing of the first text to obtain the first word vector sequence, and sequentially arrange word vectors of the words obtained by the lexing of the second text to obtain the second word vector sequence. In practice, the first word vector sequence and the second word vector sequence each may be regarded as a matrix consisting of sequentially arranged word vectors.

In this embodiment, the electronic device may lex the first text and the second text using a variety of lex methods. As an example, the lex method may be a statistical-based lex method, and specifically may summarize a frequency of a character combination consisting of adjacent characters in the first text and the second text to calculate a frequency of occurrence of the character combination. When the frequency is higher than a preset frequency threshold, then it is determined that the combination forms a word, thereby implementing lexing of a text. As another example, the lex method may further be a string matching principle based lex method. The electronic device may match the first text and the second text with words in a mechanical dictionary preset in the electronic device using a string matching principle, and then lex the texts based on the matched words. The string matching principle therein may be a forward maximum matching method, a backward maximum matching method, a segmentation mark setting method, a word-by-word traversal matching method, a forward optimum matching method, a backward optimum matching method, or the like. It should be noted that the electronic device may also lex the first text and the second text using a Hidden Markov Model (HMM) or the like. It should be noted that the above lex methods are prior arts which are widely researched and applied at present, and are not repeated any more herein.

In this embodiment, the electronic device may determine word vectors of the lexed words using a variety of word vector generation methods. As an example, the electronic device may pre-store a list of correspondence relationships between lots of words and word vectors, and the word vectors may have an identical number of dimensions. For a word vector of each lexed word, the electronic device may find a word vector corresponding to the word from the list of corresponding relationships. Herein, the pre-stored word vectors of lots of words may be obtained by pre-training using a machine learning method, or pre-set by technical personnel based on lots of statistical data. As another example, the electronic device may determine the word vectors of the lexed words using various open-source word vector calculation tools (e.g., word2vec, etc.). It should be noted that the above word vector generation methods are prior arts which are widely researched and applied at present, and are not repeated any more herein.

Step 202, inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts.

In this embodiment, the electronic device may store a pre-trained convolutional neural network containing at least one multi-scale convolutional layer, where the convolutional neural network may be used for extracting characteristics of texts, and the multi-scale convolutional layer may output a plurality of vector sequences. The electronic device may first input the first word vector sequence and the second word vector sequence respectively into a pre-trained convolutional neural network, and then identify vector sequences in a plurality of vector sequences outputted by a last multi-scale convolutional layer in the at least one multi-scale convolutional layer as eigenvector sequences, to obtain eigenvector sequence groups respectively corresponding to the texts, where an eigenvector group corresponding to the first text consists of a plurality of eigenvector sequences outputted by the last multi-scale convolutional layer after inputting the first word vector sequence into the convolutional neural network, and an eigenvector group corresponding to the second text consists of a plurality of eigenvector sequences outputted by the last multi-scale convolutional layer after inputting the second word vector sequence into the convolutional neural network. In practice, the convolutional neural network is a feedforward neural network, artificial neuron of which may respond to peripheral units within a part of coverage area, and has outstanding performance for text processing.

It should be noted that each multi-scale convolutional layer in the pre-trained convolutional neural network may consist of convolutional layers in a plurality of scales, where convolutional layers in each scale have different window lengths (i.e., the number of vectors inputted into a convolution kernel each time is different; the convolution kernel is a parameter matrix, and may also be known as a filter), there may be one or more convolutional layers in each scale, and the convolutional layers in the each scale may be used for convoluting the inputted vector sequences based on the window lengths corresponding to the convolutional layers in the each scale. It should be noted that the convolutional layers may be used for calculating convolution of the inputted vector sequences based on the corresponding window lengths. Each convolutional layer may contain any number of convolution kernels. For each convolutional layer, after convolution of the inputted vector sequences is calculated, the convolutional layer may output another vector sequence, where dimension of the vectors contained in the outputted vector sequence is the number of convolution kernels in the convolutional layer, and the number of the contained vectors is identical to the number of the vectors contained in the inputted vector sequences. Because each multi-scale convolutional layer consists of convolutional layers in a plurality of scales, each multi-scale convolutional layer may output a plurality vector sequences.

Figure 3:
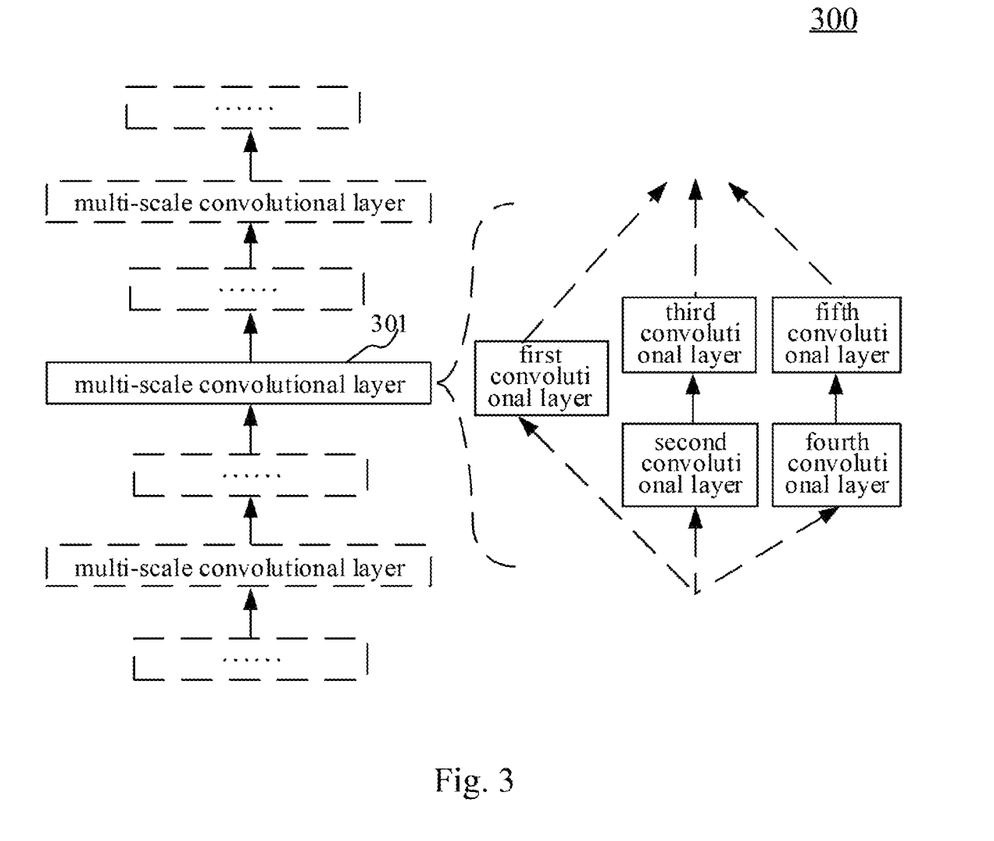
FIG. 3 is a structural diagram of a convolutional neural network according to the disclosure.

As an example, referring to FIG. 3, a structural diagram 300 of the convolutional neural network is shown. A multi-scale convolutional layer 301 of the convolutional neural network includes a first convolutional layer, a second convolutional layer, a third convolutional layer, a fourth convolutional layer and a fifth convolutional layer, where the window length of the first convolutional layer, the second convolutional layer and the fourth convolutional layer is 1, that of the third convolutional layer is 3, and that of the fifth convolutional layer is 5; and the number of the convolution kernels in the first convolutional layer, the second convolutional layer, the third convolutional layer, the fourth convolutional layer and the fifth convolutional layer is respectively A, B, C, D and E, where A, B, C, D and E each are a positive integer. A vector sequence (e.g., consisting of 100 vectors) to be inputted into the multi-scale convolutional layer may be used as a target vector sequence. Three routes shown in FIG. 3 process the target vector sequence in parallel to obtain three outputted vector sequences. Specifically, the target vector sequence is inputted into a first route, i.e., inputted into the first convolutional layer, to obtain a vector sequence consisting of 100 vectors in the dimension A through the calculation of convolution based on a window length of 1. Moreover, the target vector sequence is inputted into a second route, i.e., inputted into the second convolutional layer, to obtain a vector sequence consisting of 100 vectors in the dimension B through the calculation of convolution based on a window length of 1; and then a vector sequence consisting of the obtained vectors in the dimension B is inputted into the third convolutional layer, to obtain a vector sequence consisting of 100 vectors in the dimension C through the calculation of convolution based on a window length of 3. Moreover, the target vector sequence is inputted into a third route, i.e., inputted into the fourth convolutional layer, to obtain a vector sequence consisting of 100 vectors in the dimension D through the calculation of convolution based on a window length of 1; and then a vector sequence consisting of the obtained vectors in the dimension D is inputted into the fifth convolutional layer, to obtain a vector sequence consisting of 100 vectors in the dimension E through the calculation of convolution based on a window length of 5. Finally, the multi-scale convolutional layer 301 outputs the vector sequence consisting of 100 vectors in the dimension A, the vector sequence consisting of 100 vectors in the dimension C, and the vector sequence consisting of 100 vectors in the dimension E.

Step 203, combining eigenvector sequences in the identified eigenvector sequence group corresponding to each text to generate a combined eigenvector sequence corresponding to the each text.

In this embodiment, the electronic device may combine eigenvector sequences in the identified eigenvector sequence group corresponding to each text (i.e., each text in the first text and the second text) to generate a combined eigenvector sequence corresponding to the each text. Specifically, the electronic device may determine, for each text, an order of vectors forming eigenvector sequences corresponding to the each text in the corresponding eigenvector sequences, combine vectors in an identical order in the eigenvector sequences into a vector, and use the combined vector as a combined eigenvector, to generate a combined eigenvector sequence corresponding to the each text.

As an example, an eigenvector group corresponding to the first text includes a first eigenvector sequence consisting of 100 vectors in a dimension M, a second eigenvector sequence consisting of 100 vectors in a dimension N and a third eigenvector sequence consisting of 100 vectors in a dimension P, where the M, N and P each are a positive integer. The electronic device may combine first vectors respectively in the first eigenvector sequence, the second eigenvector sequence and the third eigenvector sequence, to obtain a vector in a dimension M+N+P; then combine second vectors respectively in the first eigenvector sequence, the second eigenvector sequence and the third eigenvector sequence, to obtain another vector in the dimension M+N+P; and finally obtain 100 vectors in the dimension M+N+P in the same manner. The electronic device may identify the obtained combined vectors as a combined eigenvector, to obtain a combined eigenvector sequence corresponding to the first text. It should be noted that a combined eigenvector sequence corresponding to the second text is generated in the same manner as that in the example, and is not repeated any more herein.

Step 204, analyzing the generated combined eigenvector sequences to determine whether the first text and the second text pass a similarity check.

In this embodiment, the electronic device may implement numerical analysis of the generated combined eigenvector sequences using a variety of analysis methods to determine whether the first text and the second text pass a similarity check. As an example, the electronic device may input the combined eigenvector sequence corresponding to the first text and the combined eigenvector sequence corresponding to the second text respectively into a pre-trained neural network containing a plurality of fully connected layers, identify a value outputted by the neural network as a similarity check result, and then determine the first text and the second text passing a similarity check if the value is greater than a preset value (e.g., 0.5 or 0.8 or the like); determine the first text and the second text failing to pass the similarity check if the value is not greater than the preset value. Here, each fully connected layer of the neural network may be used first for linear transformation of data inputted into the each fully connected layer, and then for non-linear transformation (e.g., using a Softmax function, a sigmoid function or other non-linear activation functions), to obtain output of the each fully connected layer. It should be noted that the neural network may be obtained by supervised pre-training using a machine learning method, and the method of training the fully connected layer of the neural network is a prior art which is widely researched and applied at present, and is not repeated any more herein.

As another example, the electronic device may determine, for each text, an average value in each dimension of the eigenvectors contained in the combined eigenvector sequence corresponding to the each text, identify a vector consisting of the average value in each dimension as an average eigenvector corresponding to the each text, and then implement numerical analysis of the obtained average eigenvectors corresponding to the texts (e.g., calculating a similarity between two average eigenvectors), to determine whether the first text and the second text pass the similarity check.

In some optional modes of implementing this embodiment, the electronic device may first extract, for each text, a maximum value in each dimension of the eigenvectors contained in a combined eigenvector sequence corresponding to the each text, and identify vectors consisting of the extracted maximum value in each dimension as a target eigenvector corresponding to the each text, to obtain a target eigenvector corresponding to the first text and a target eigenvector corresponding to the second text. Then the electronic device may determine whether the first text and the second text pass a similarity check based on the generated target eigenvectors corresponding to the texts. As an example, the electronic device may determine a similarity between the target eigenvector corresponding to the first text and the target eigenvector corresponding to the second text using a variety of similarity calculation methods (e.g., a cosine similarity algorithm, a Euclidean distance algorithm, a Jaccard similarity measure method, or the like). Then the electronic device determines the first text and the second text passing a similarity check in response to determining the similarity being greater than a preset similarity threshold; determines the first text and the second text failing to pass the similarity check in response to determining the similarity being not greater than the similarity threshold, where the similarity threshold may be any value, e.g., 0.5, 0.8 or the like. It should be noted that the similarity calculation methods are prior arts which are widely researched and applied at present, and are not repeated any more herein.

Figure 4:
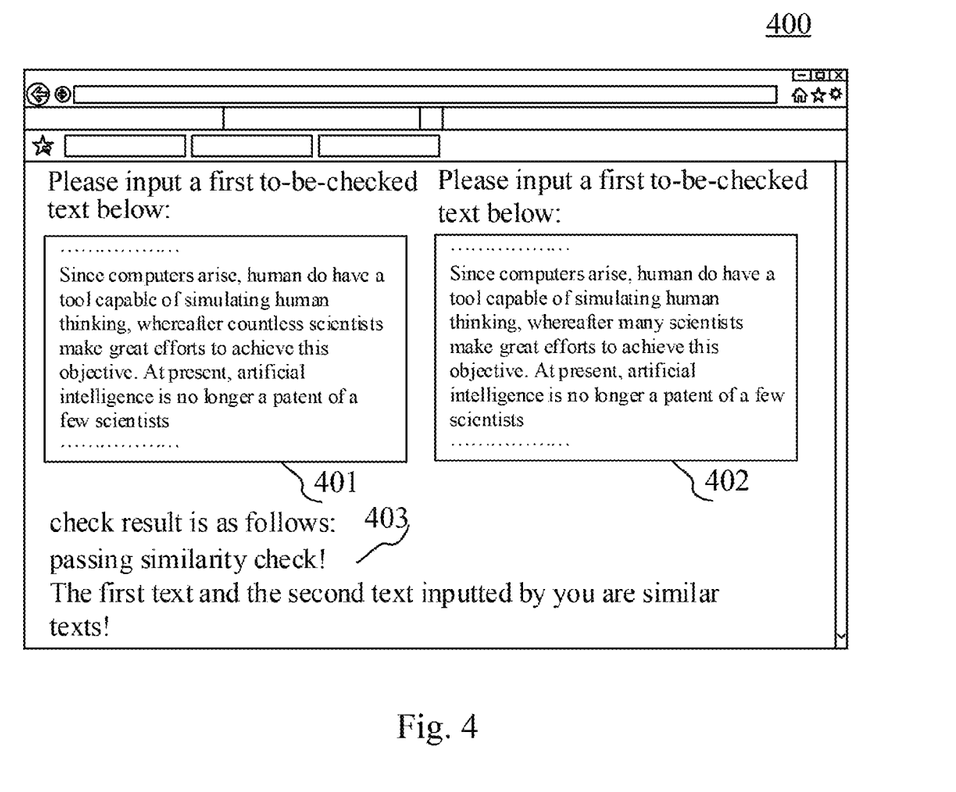
FIG. 4 is a schematic diagram of an application scenario of a method for checking a text according to the disclosure.

Further referring to FIG. 4, a schematic diagram 400 of an application scenario of a method for checking a text according to this embodiment is shown. In the application scenario of FIG. 4, a user edits a first to-be-checked text and a second to-be-checked text respectively in a form 401 and in a form 402 using a browser installed on a terminal device. Then after the edited texts are submitted, a processing server providing a similarity check service of the texts submitted by the user lexes the received first text and the received second text respectively, to obtain a first word vector sequence and a second word vector sequence, inputs the first word vector sequence and the second word vector sequence respectively into a pre-trained convolutional neural network containing at least one multi-scale convolutional layer to obtain eigenvector sequence groups corresponding to the texts, combines eigenvector sequences in each eigenvector sequence group to obtain eigenvector sequences corresponding to the texts, and finally analyzes the generated combined eigenvector sequences to determine whether the first text and the second text pass a similarity check, and sends the text check result to the terminal device. The terminal device presents the text check result 403.

The method provided in the embodiments of the disclosure lexes a first to-be-checked text and a second to-be-checked text to generate a first word vector sequence and a second word vector sequence, inputs the first word vector sequence and the second word vector sequence respectively into a pre-trained convolutional neural network containing at least one multi-scale convolutional layer to obtain eigenvector sequence groups respectively corresponding to the texts, combines eigenvector sequences to generate combined eigenvector sequences corresponding to the texts, and finally analyzes the generated combined eigenvector sequences to determine whether the first text and the second text pass a similarity check, thereby implementing the calculation of multi-scale convolution of word vector sequences and improving the flexibility in checking a text relative to calculation of single fixed-scale convolution. Moreover, because of using calculation of multi-scale convolution, the ability to extract characteristics of texts is enhanced, and then the accuracy in checking a text similarity is improved.

Figure 5:
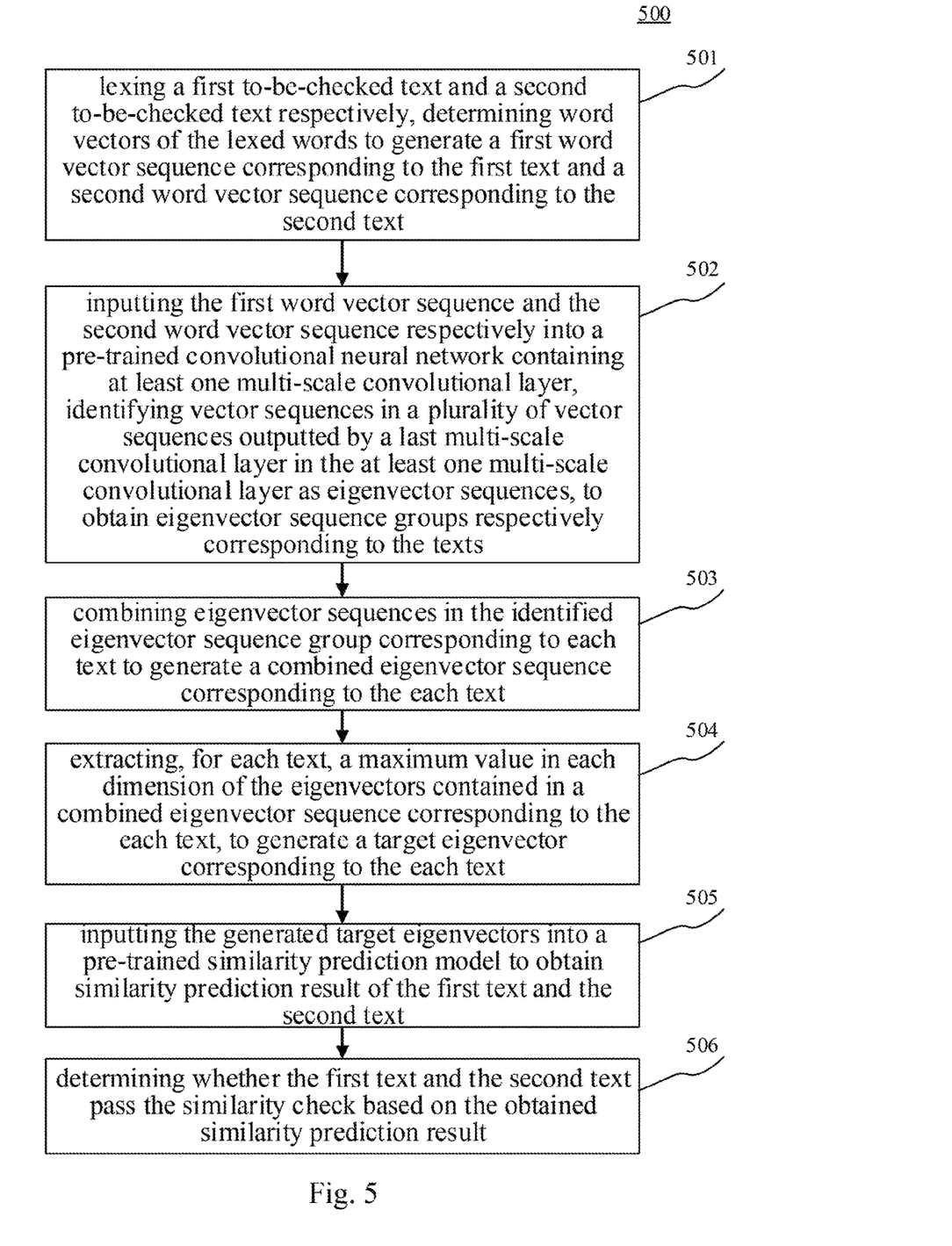
FIG. 5 is a flow diagram of another embodiment of a method for checking a text according to the disclosure.

Further referring to FIG. 5, a flow process 500 of another embodiment of a method for checking a text is shown. The flow process 500 of the method for checking a text includes the following steps:

Step 501, lexing a first to-be-checked text and a second to-be-checked text respectively, determining word vectors of the lexed words to generate a first word vector sequence corresponding to the first text and a second word vector sequence corresponding to the second text.

In this embodiment, the electronic device on which the method for checking a text runs (e.g., the server 105 shown in FIG. 1) may first extract a first to-be-checked text and a second to-be-checked text, may lex the first text and the second text using a variety of lex methods; and then determine word vectors of the lexed words to generate a first word vector sequence corresponding to the first text and a second word vector sequence corresponding to the second text.

It should be noted that the operation of this step is practically identical to the operation of the step 201, and is not repeated any more herein.

Step 502, inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts.

In this embodiment, the electronic device may store a pre-trained convolutional neural network containing at least one multi-scale convolutional layer, where the convolutional neural network may be used for extracting characteristics of texts. The electronic device may first input the first word vector sequence and the second word vector sequence respectively into the pre-trained convolutional neural network, and then identify vector sequences in a plurality of vector sequences outputted by a last multi-scale convolutional layer in the at least one multi-scale convolutional layer as eigenvector sequences, to obtain eigenvector sequence groups respectively corresponding to the texts.

In this embodiment, a deep coherent layer and a pooling layer are arranged between two adjacent multi-scale convolutional layers in the at least one multi-scale convolutional layer, the deep coherent layer is used for combining a plurality of vector sequences outputted by the multi-scale convolutional layer to generate a combined vector sequence consisting of a plurality of combined vectors, and the pooling layer is used for analyzing the combined vector sequences generated by the deep coherent layer in a preset window size (for example, if the window size is 2, then two combined vectors are extracted each time as inputs of the pooling layer) and a preset window sliding step length (for example, if the window sliding step length is 2, then every other 2 combined vectors are extracted) to obtain simplified combined vector sequences.

As an example, two multi-scale convolutional layers are respectively a first multi-scale convolutional layer and a second multi-scale convolutional layer, where the first multi-scale convolutional layer may output a first vector sequence (e.g., consisting of 100 10-dimensional vectors), a second vector sequence (e.g., consisting of 100 20-dimensional vectors) and a third vector sequence (e.g., consisting of 100 30-dimensional vectors). The first multi-scale convolutional layer is connected to a deep coherent layer, the deep coherent layer is connected to a pooling layer, the pooling layer is connected to the second multi-scale convolutional layer, and the pooling layer has a preset window size of 2 and a preset window sliding step length of 2. The deep coherent layer may combine the first vector sequence, the second vector sequence and the third vector sequence outputted by the first multi-scale convolutional layer, identify the vector sequence (consisting of 100 60-dimensional vectors) obtained by combination as a combined vector sequence, and input the combined vector sequence to the pooling layer. The pooling layer may first extract, according to the window size and the window sliding step length, a maximum value in each dimension of a first vector and a second vector in the combined vector sequence to generate a new vector; extract a maximum value in each dimension of a third vector and a fourth vector in the combined vector sequence to generate another new vector, and so on; obtain a vector sequence consisting of the generated new vectors (consisting of 50 60-dimensional vectors); and finally input the generated vector sequence into the second multi-scale convolutional layer.

Step 503, combining eigenvector sequences in the identified eigenvector sequence group corresponding to each text to generate a combined eigenvector sequence corresponding to the each text.

In this embodiment, the electronic device may combine eigenvector sequences in the identified eigenvector sequence group corresponding to each text (i.e., each text of the first text and the second text) to generate a combined eigenvector sequence corresponding to the each text. Specifically, the electronic device may determine, for each text, an order of vectors forming eigenvector sequences corresponding to the each text in the corresponding eigenvector sequences, combine vectors in an identical order in the eigenvector sequences into a vector, and use the combined vector as a combined eigenvector, to generate a combined eigenvector sequence corresponding to the each text.

Step 504, extracting, for each text, a maximum value in each dimension of the eigenvectors contained in the combined eigenvector sequence corresponding to the each text, to generate a target eigenvector corresponding to the each text.

In this embodiment, the electronic device may first extract, for each text, a maximum value in each dimension of the eigenvectors contained in the combined eigenvector sequence corresponding to the each text, and identify vectors consisting of the extracted maximum value in each dimension as a target eigenvector corresponding to the each text, to obtain a target eigenvector corresponding to the first text and a target eigenvector corresponding to the second text.

Step 505, inputting the generated target eigenvectors into a pre-trained similarity prediction model to obtain similarity prediction result of the first text and the second text.

In this embodiment, the electronic device may input the generated target eigenvectors into a pre-trained similarity prediction model to obtain similarity prediction result of the first text and the second text, where the similarity prediction result may be a value. It should be noted that the similarity prediction model may be used for characterizing a corresponding relationship between target eigenvector sequences of a plurality of texts and similarity prediction results of the plurality of texts. As an example, the similarity prediction model may be a list of corresponding relationships pre-established by technical personnel based on statistics of lots of target eigenvectors and similarity prediction results and storing corresponding relationships between a plurality of target eigenvector groups and similarity prediction results.

In some optional modes of implementing this embodiment, the similarity prediction model may also be generated by training in the following ways:

First, a preset training sample may be extracted, where the training sample may include a first training text, a second training text, and an identifier for indicating whether the first training text is similar to the second training text.

Then, the first training text and the second training text are analyzed to generate target eigenvectors respectively corresponding to the first training sample and the second training sample. It should be noted that the electronic device may generate target eigenvectors respectively corresponding to the first training sample and the second training sample using a method practically identical to that of the step 201 to the step 203, which is not repeated any more herein.

Finally, a similarity prediction model may be obtained by training using a machine learning method, using the target eigenvectors respectively corresponding to the first training sample and the second training sample as inputs, and using the identifier as an input. It should be noted that the electronic device may obtain the similarity prediction model by training using an classification model, such as a naive Bayesian model (NBM) or a support vector machine (SVM), or using a classification function (e.g., a softmax function).

Step 506, determining whether the first text and the second text pass a similarity check based on the obtained similarity prediction result.

In this embodiment, the electronic device may determine whether the first text and the second text pass a similarity check based on the obtained similarity prediction result. Specifically, if the obtained similarity prediction result is greater than a preset value (e.g., 0.5 or 0.8 or the like), then the electronic device determines the first text and the second text passing the similarity check; if the obtained similarity prediction result is not greater than the preset value, then the electronic device determines the first text and the second text failing to pass the similarity check.

As can be seen from FIG. 5, compared with the embodiment corresponding to FIG. 5, the flow process 500 of the method for checking a text in this embodiment highlights analyzing combined eigenvector sequences based on a similarity prediction model. Therefore, the solution described in this embodiment further improves the flexibility and accuracy in checking a text.

Figure 6:
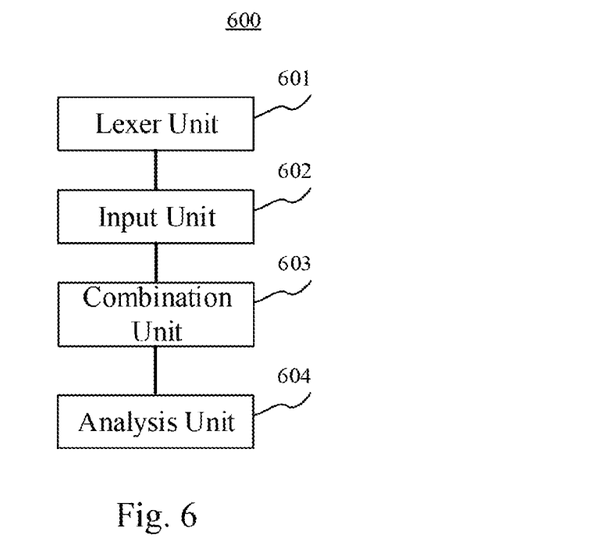
FIG. 6 is a structural diagram of an embodiment of an apparatus for checking a text according to the disclosure.

Further referring to FIG. 6, as implementation of the method shown in the figures, the disclosure provides an embodiment of an apparatus for checking a text, the embodiment of the apparatus corresponds to the embodiment of the method shown in FIG. 2, and the apparatus may be specifically applied in a variety of electronic devices.

As shown in FIG. 6, the apparatus 600 for checking a text according to this embodiment includes: a lexer unit 601, configured for lexing a first to-be-checked text and a second to-be-checked text respectively, and determining word vectors of the lexed words to generate a first word vector sequence corresponding to the first text and a second word vector sequence corresponding to the second text; an input unit 602, configured for inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, where the convolutional neural network is used for extracting characteristics of texts; a combination unit 603, configured for combining eigenvector sequences in the identified eigenvector sequence group corresponding to each text to generate a combined eigenvector sequence corresponding to the each text; and an analysis unit 604, configured for analyzing the generated combined eigenvector sequences to determine whether the first text and the second text pass a similarity check.

In this embodiment, the lexer unit 601 may first extract a first to-be-checked text and a second to-be-checked text. The lexer unit 601 may lex the first text and the second text using a variety of lex methods; and then determine word vectors of the lexed words using a variety of word vector generation methods, to generate a first word vector sequence corresponding to the first text and a second word vector sequence corresponding to the second text.

In this embodiment, the input unit 602 may first input the first word vector sequence and the second word vector sequence respectively into a pre-trained convolutional neural network containing at least one multi-scale convolutional layer, and then identify vector sequences in a plurality of vector sequences outputted by a last multi-scale convolutional layer in the at least one multi-scale convolutional layer as eigenvector sequences, to obtain eigenvector sequence groups respectively corresponding to the texts.

In this embodiment, the combination unit 603 may combine eigenvector sequences in the identified eigenvector sequence group corresponding to each text (i.e., each text of the first text and the second text), to generate a combined eigenvector sequence corresponding to the each text. Specifically, the combination unit 603 may determine, for each text, an order of vectors forming eigenvector sequences corresponding to the each text in the corresponding eigenvector sequences, combine vectors in an identical order in the eigenvector sequences into a vector, and use the combined vector as a combined eigenvector, to generate a combined eigenvector sequence corresponding to the each text.

In some optional modes of implementing this embodiment, a deep coherent layer and a pooling layer are arranged between adjacent multi-scale convolutional layers in the at least one multi-scale convolutional layer, the deep coherent layer may be used for combining a plurality of vector sequences outputted by the multi-scale convolutional layer to generate a combined vector sequence consisting of a plurality of combined vectors, and the pooling layer may be used for analyzing the combined vector sequence generated by the deep coherent layer in a preset window size and a preset window sliding step length to obtain a simplified combined vector sequence.

In this embodiment, the analysis unit 604 may implement numerical analysis of the generated combined eigenvector sequence using a variety of analysis methods to determine whether the first text and the second text pass a similarity check.

In some optional modes of implementing this embodiment, the analysis unit 604 may include a generation module and a determination module (not shown in the figure), where the generation module may be configured for extracting, for each text, a maximum value in each dimension of the eigenvectors contained in a combined eigenvector sequence corresponding to the each text, to generate a target eigenvector corresponding to the each text; and the determination module may be configured for determining whether the first text and the second text pass the similarity check based on the generated target eigenvectors corresponding to the texts.

In some optional modes of implementing this embodiment, the determination module may be further configured for inputting the generated target eigenvectors into a pre-trained similarity prediction model to obtain similarity prediction result of the first text and the second text, where the similarity prediction model is used for characterizing a correspondence relationship between target eigenvector sequences of a plurality of texts and similarity prediction results of the plurality of texts; and determining whether the first text and the second text pass a similarity check based on the obtained similarity prediction result.

In some optional modes of implementing this embodiment, the apparatus may further include an extraction unit, a generation unit and a training unit (not shown in the figure), where the extraction unit may be configured for extracting a preset training sample, where the training sample includes a first training text, a second training text, and an identifier for indicating whether the first training text is similar to the second training text; the generation unit may be configured for analyzing the first training text and the second training text to generate target eigenvectors respectively corresponding to the first training sample and the second training sample; and the training unit may be configured for obtaining a similarity prediction model by training using a machine learning method, using the target eigenvectors respectively corresponding to the first training sample and the second training sample as inputs, and using the identifier as an input.

In some optional modes of implementing this embodiment, the determination module may be further configured for determining a similarity between a target eigenvector corresponding to the first text and a target eigenvector corresponding to the second text; and determining the first text and the second text passing a similarity check in response to determining the similarity being greater than a preset similarity threshold; determining the first text and the second text failing to pass the similarity check in response to determining the similarity being not greater than the similarity threshold.

In the apparatus provided in the embodiments of the disclosure, the lexer unit 601 lexes a first to-be-checked text and a second to-be-checked text respectively to generate a first word vector sequence and a second word vector sequence; the input unit 602 inputs the first word vector sequence and the second word vector sequence respectively into a pre-trained convolutional neural network containing at least one multi-scale convolutional layer, to obtain eigenvector sequence groups respectively corresponding to the texts; the combination unit 603 combines eigenvector sequences to generate combined eigenvector sequences corresponding to the texts; and finally the analysis unit 604 analyzes the generated combined eigenvector sequences to determine whether the first text and the second text pass the similarity check, thereby implementing the calculation of multi-scale convolution of word vector sequences, and improving the flexibility in checking a text relative to the calculation of single fixed-scale convolution. Moreover, because of using the calculation of multi-scale convolution, the ability to extract characteristics of texts is enhanced, and then the accuracy in checking text similarity is improved.

Below referring to FIG. 7, a structural diagram of a computer system 700 of a server applicable for implementing embodiments of the disclosure is shown. The server shown in FIG. 7 is only an example, and shall not limit the functions and serviceable range of embodiments of the disclosure in any way.

Figure 7:
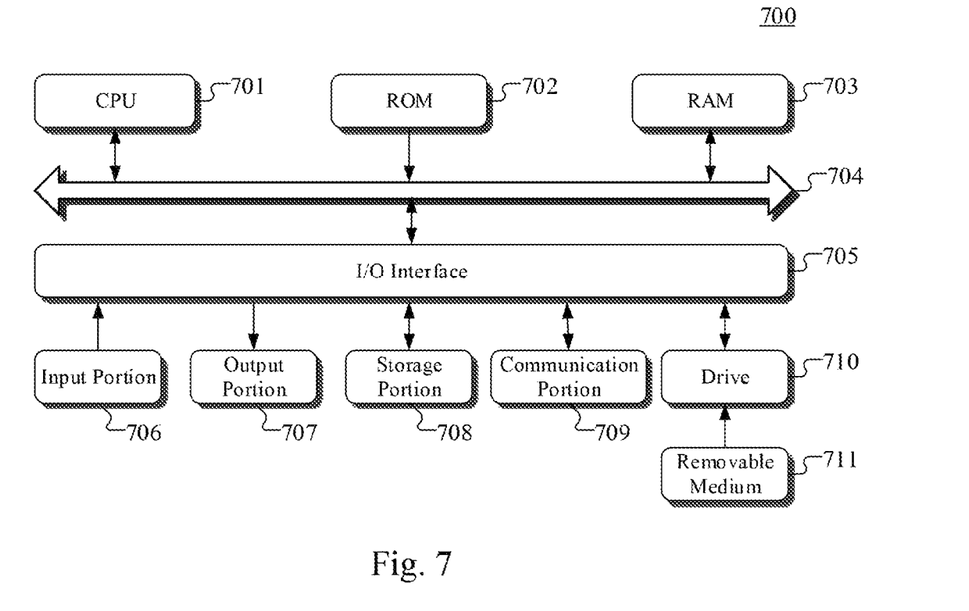
FIG. 7 is a structural diagram of a computer system of a server applicable for implementing embodiments of the disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a lexer unit, an input unit, a combination unit and an analysis unit, where the names of these units or modules do not in some cases constitute a limitation to such units or modules themselves. For example, the lexer unit may also be described as "a unit for lexing a first to-be-checked text and a second to-be-checked text."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: lex a first to-be-checked text and a second to-be-checked text respectively, determine word vectors of the lexed words to generate a first word vector sequence corresponding to the first text and a second word vector sequence corresponding to the second text; input the first word vector sequence and the second word vector sequence respectively into a pre-trained convolutional neural network containing at least one multi-scale convolutional layer, identify vector sequences in a plurality of vector sequences outputted by a last multi-scale convolutional layer in the at least one multi-scale convolutional layer as eigenvector sequences, to obtain eigenvector sequence groups corresponding to the texts; combine eigenvector sequences in the identified eigenvector sequence group to generate a combined eigenvector sequence; and analyze the generated combined eigenvector sequences to determine whether the first text and the second text pass a similarity check.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An artificial intelligence based method for checking a text, the method comprising:

lexing a first to-be-checked text and a second to-be-checked text respectively to obtain lexed words, determining word vectors of the lexed words to generate a first word vector sequence corresponding to the first text and a second word vector sequence corresponding to the second text;

inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, wherein the convolutional neural network is used for extracting characteristics of texts;

combining eigenvector sequences in the obtained eigenvector sequence group corresponding to each text to generate a combined eigenvector sequence corresponding to each text; and analyzing the generated combined eigenvector sequences to determine whether the first text and the second text pass a similarity check.

2. The method for checking a text according to claim 1, wherein the analyzing the generated combined eigenvector sequences to determine whether the first text and the second text pass a similarity check comprises:

extracting, for each text, a maximum value in each dimension of the eigenvectors contained in a combined eigenvector sequence corresponding to each text, to generate a target eigenvector corresponding to the each text; and determining whether the first text and the second text pass the similarity check based on the generated target eigenvectors corresponding to the texts.

3. The method for checking a text according to claim 2, wherein the determining whether the first text and the second text pass the similarity check based on the generated target eigenvectors corresponding to the texts comprises:

inputting the generated target eigenvectors into a pre-trained similarity prediction model to obtain similarity prediction result of the first text and the second text, wherein the similarity prediction model is used for characterizing a corresponding relationship between target eigenvector sequences of a plurality of texts and similarity prediction results of the plurality of texts; and determining whether the first text and the second text pass the similarity check based on the obtained similarity prediction result.

4. The method for checking a text according to claim 3, wherein the method further comprises training the similarity prediction model, comprising:

extracting a preset training sample, wherein the training sample comprises a first training text, a second training text, and an identifier for indicating whether the first training text is similar to the second training text;

analyzing the first training text and the second training text to generate target eigenvectors respectively corresponding to the first training sample and the second training sample; and obtaining the similarity prediction model by training using a machine learning method, using the target eigenvectors respectively corresponding to the first training sample and the second training sample as inputs, and using the identifier as an input.

5. The method for checking a text according to claim 2, wherein the determining whether the first text and the second text pass the similarity check based on the generated target eigenvectors corresponding to the texts comprises:
  determining a similarity between a target eigenvector corresponding to the first text and a target eigenvector corresponding to the second text;
  determining the first text and the second text passing the similarity check in response to determining the similarity being greater than a preset similarity threshold; and
  determining the first text and the second text failing to pass the similarity check in response to determining the similarity being not greater than the similarity threshold.

6. The method for checking a text according to claim 1, wherein a deep coherent layer and a pooling layer are arranged between adjacent multi-scale convolutional layers in the at least one multi-scale convolutional layer, the deep coherent layer is used for combining a plurality of vector sequences outputted by the multi-scale convolutional layer to generate a combined vector sequence consisting of a plurality of combined vectors, and the pooling layer is used for analyzing the combined vector sequence generated by the deep coherent layer in a preset window size and a preset window sliding step length to obtain a simplified combined vector sequence.

7. An artificial intelligence based apparatus for checking a text, the apparatus comprising:
  at least one processor; and
  a memory storing instructions, the instructions when executed by the at least one processor, cause the at least one processor to perform operations, the operations comprising:
    lexing a first to-be-checked text and a second to-be-checked text respectively to obtain lexed words, determining word vectors of the lexed words to generate a first word vector sequence corresponding to the first text and a second word vector sequence corresponding to the second text;
    inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, wherein the convolutional neural network is used for extracting characteristics of texts;
    combining eigenvector sequences in the obtained eigenvector sequence group corresponding to each text to generate a combined eigenvector sequence corresponding to each text; and
    analyzing the generated combined eigenvector sequences to determine whether the first text and the second text pass a similarity check.

8. The apparatus for checking a text according to claim 7, wherein the analyzing the generated combined eigenvector sequences to determine whether the first text and the second text pass a similarity check comprises:
  extracting, for each text, a maximum value in each dimension of the eigenvectors contained in a combined eigenvector sequence corresponding to the each text, to generate a target eigenvector corresponding to the each text; and
  determining whether the first text and the second text pass the similarity check based on the generated target eigenvectors corresponding to the texts.

9. The apparatus for checking a text according to claim 8, wherein the determining whether the first text and the second text pass the similarity check based on the generated target eigenvectors corresponding to the texts comprises:
  inputting the generated target eigenvectors into a pre-trained similarity prediction model to obtain similarity prediction result of the first text and the second text, wherein the similarity prediction model is used for characterizing a corresponding relationship between target eigenvector sequences of a plurality of texts and similarity prediction results of the plurality of texts; and
  determining whether the first text and the second text pass the similarity check based on the obtained similarity prediction result.

10. The apparatus for checking a text according to claim 9, wherein the operations further comprise training the similarity prediction model, comprising:
  extracting a preset training sample, wherein the training sample comprises a first training text, a second training text, and an identifier for indicating whether the first training text is similar to the second training text;
  analyzing the first training text and the second training text to generate target eigenvectors respectively corresponding to the first training sample and the second training sample; and
  obtaining the similarity prediction model by training using a machine learning method, using the target eigenvectors respectively corresponding to the first training sample and the second training sample as inputs, and using the identifier as an input.

11. The apparatus for checking a text according to claim 8, wherein the determining whether the first text and the second text pass the similarity check based on the generated target eigenvectors corresponding to the texts comprises:
  determining a similarity between a target eigenvector corresponding to the first text and a target eigenvector corresponding to the second text;
  determining the first text and the second text passing the similarity check in response to determining the similarity being greater than a preset similarity threshold; and
  determining the first text and the second text failing to pass the similarity check in response to determining the similarity being not greater than the similarity threshold.

12. The apparatus for checking a text according to claim 7, wherein a deep coherent layer and a pooling layer are arranged between adjacent multi-scale convolutional layers in the at least one multi-scale convolutional layer, the deep coherent layer is used for combining a plurality of vector sequences outputted by the multi-scale convolutional layer to generate a combined vector sequence consisting of a plurality of combined vectors, and the pooling layer is used for analyzing the combined vector sequence generated by the deep coherent layer in a preset window size and a preset window sliding step length to obtain a simplified combined vector sequence.

13. A non-transitory computer storage medium storing a computer program, the computer program when executed by one or more processors, causes the one or more processors to perform operations, the operations comprising:

lexing a first to-be-checked text and a second to-be-checked text respectively to obtain lexed words, determining word vectors of the lexed words to generate a first word vector sequence corresponding to the first text and a second word vector sequence corresponding to the second text;

inputting the first word vector sequence and the second word vector sequence respectively into a pre-trained convolutional neural network containing at least one multi-scale convolutional layer, identifying vector sequences in a plurality of vector sequences outputted by a last multi-scale convolutional layer in the at least one multi-scale convolutional layer as eigenvector sequences, to obtain eigenvector sequence groups respectively corresponding to the texts, wherein the convolutional neural network is used for extracting characteristics of texts;

combining eigenvector sequences in the obtained eigenvector sequence group corresponding to each text to generate a combined eigenvector sequence corresponding to each text; and analyzing the generated combined eigenvector sequences to determine whether the first text and the second text pass a similarity check.

* * * * *